United States Patent
Cortigiani et al.

(10) Patent No.: US 8,760,129 B2
(45) Date of Patent: Jun. 24, 2014

(54) LOW EMI DRIVER CIRCUIT

(75) Inventors: Fabrizio Cortigiani, Vigonza (IT); Franco Mignoli, Verona (IT)

(73) Assignee: Infineon Technologies Austria AG, Villach (AT)

( * ) Notice: Subject to any disclaimer, the term of this patent is extended or adjusted under 35 U.S.C. 154(b) by 253 days.

(21) Appl. No.: 13/340,326

(22) Filed: Dec. 29, 2011

(65) Prior Publication Data

US 2013/0169256 A1 Jul. 4, 2013

(51) Int. Cl.
*H02M 3/158* (2006.01)

(52) U.S. Cl.
USPC .......................................... 323/224; 323/288

(58) Field of Classification Search
USPC ................ 323/223–225, 242, 288, 326
See application file for complete search history.

(56) References Cited

U.S. PATENT DOCUMENTS

| 7,884,557 B2* | 2/2011 | Steele et al. ............... 315/306 |
| 2013/0049628 A1* | 2/2013 | Kwong et al. ............. 315/250 |

* cited by examiner

*Primary Examiner* — Harry Behm
(74) *Attorney, Agent, or Firm* — Slater & Matsil, L.L.P.

(57) ABSTRACT

A driver circuit, in accordance with one example, includes a controllable current source operably coupled to the load and configured to sink or source a first current in accordance with a control signal. A controllable switch is responsive to an input signal, operably coupled to the current source, and configured to take over, or not, the first current in accordance with an input signal. The first current is directed as a load current through the load when the controllable switch is driven into a blocking state. The first current is directed through the controllable switch when the controllable switch is driven into a conducting state thus bypassing the load. An input signal includes a first series of pulses defining the desired load current waveform in accordance with a desired modulation scheme.

22 Claims, 4 Drawing Sheets

US 8,760,129 B2

LOW EMI DRIVER CIRCUIT

TECHNICAL FIELD

The present disclosure relates to the field of driver circuits for providing modulated supply currents to electrical loads, particularly to LED driver circuits for providing a modulated source current to LED devices.

BACKGROUND

Various driver circuits are known for supplying a defined current to loads such as light emitting diodes (LEDs). As LEDs are current driven electrical loads usually a current source is used for supplying the LED with current. The load current defines the brightness of the LED device which may be a single LED component or a device including a plurality of LEDs, e.g., connected in series. In order to allow for adjusting the intensity of the emitted light (i.e., the perceived brightness) a controllable current source may be used that is set to a current representing a desired brightness. In digitally controlled applications a digital-to-analog converter (DAC) may be used to set the current of the controllable current source.

Since the human eye cannot resolve high frequency brightness fluctuations of approximately 100 hertz or higher, it is known to supply the LED with a modulated (e.g., pulse width modulated or pulse density modulated, etc.) current of sufficient frequency. In this case the human eye low-pass filters the resulting (e.g., pulse width) modulated brightness of the LED, i.e., the eye can only sense a mean brightness that depends on the mean LED current which is proportional to the duty cycle of the pulse width modulation (PWM). Consequently only the mean current through a LED is relevant to the brightness perceived by the human eye. It should be noted that many other types of electrical loads may be driven in a similar way as LEDs, e.g., a generic load whose load current is to be set via modulating a constant source current. Varying the average load current by using modulation techniques are usually preferred over driver circuits which continuously vary the load current as the actual wavelength of the emitted light may vary in an undesired manner when varying the actual load current. Using modulation techniques for adjusting the average load current (and thus the perceived brightness) do not give rise to wavelength variations as the actual load current can only assume the values zero and a preset maximum load current in accordance with a modulation signal.

For the reasons outlined above, driver circuits for driving light emitting diodes or other loads often have to be designed to switch the source current rather fast which gives rise to high current gradients in the supply lines and corresponding electromagnetic emission and electromagnetic interference (EMI). However, particularly when driving LEDs a fast switching of the load is a requirement as load current values different from the desired source current may cause a change in the hue of the emitted color and thus degrade the whole operation of a connected LED device.

In order to reduce the emissions and improve the electromagnetic compatibility (EMC) while still providing a fast and precise switching of the load current there is a need for an improved driver circuit for driving LEDs or other current-driven loads.

SUMMARY OF THE INVENTION

A driver circuit for providing a modulated load current to a load is disclosed. In accordance with one example of the invention the circuit comprises a controllable current source operably coupled to the load and configured to sink or source a first current in accordance with a control signal. A controllable switch is responsive to an input signal, is operably coupled to the current source, and is configured to take over, or not, the first current in accordance with an input signal. The first current is directed as a load current through the load when the controllable switch is driven into a blocking state. The first current is directed through the controllable switch when the controllable switch is driven into a conducting state thus bypassing the load. An input signal includes a first series of pulses defining the desired load current waveform in accordance with a desired modulation scheme. The current source is controlled such that the first current is ramped up before a pulse of the input signal and ramped down after the pulse to achieve desired ramp-up and ramp-down times.

Further a method for providing a modulated load current to a load is disclosed. In accordance with a further example of the invention the method comprises providing a first current in accordance with a control signal, which is configured to take over, or not, the first current using a controllable switch in accordance with an input signal. The first current is directed as a load current through the load when the controllable switch is driven into a blocking state. The first current is directed through the controllable switch when the controllable switch is driven into a conducting state thus bypassing the load. An input signal includes a first series of pulses defining the desired load current waveform in accordance with a desired modulation scheme, and wherein the current source is controlled such that the first current is ramped up before a pulse of the input signal and ramped down after the pulse to achieve desired ramp-up and ramp-down times.

The ramp-up and ramp-down times may be designed to provide a desired slew rate of the control signal and thus of the first current.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Various types of electrical loads are usually supplied with a modulated load current which is derived from a constant supply current using known modulation techniques such as pulse width modulation (PWM), pulse frequency modulation (PFM) or pulse density modulation (PDM) which is also known as sigma-delta modulation. Combination of these modulation techniques are applicable dependent on the application. All these modulation techniques are used to modulate a supply current at a high frequency (e.g., 10 kHz or more for LED driver circuits) so as to achieve a desired value of a low-frequency or quasi-static parameter, such as the average load current, the observable brightness of a LED, or the observable color when driving two or more LEDs of different colors in a multi-color LED arrangement.

Figure 1:
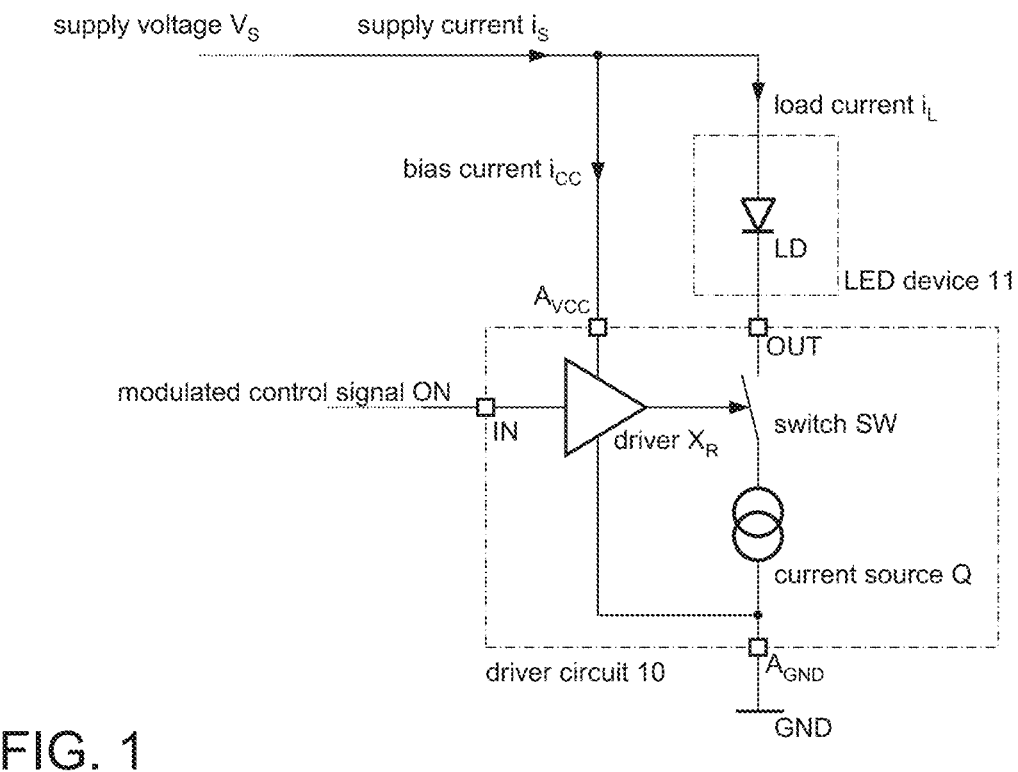
FIG. 1 illustrates one exemplary driver circuit for providing a defined modulated current to a load.

FIG. 1 illustrates one simplified example of a driver circuit for providing one LED (or a series circuit of two or more LEDs) with a defined modulated current having an adjustable average which corresponds to the observable brightness of the LED. A power supply (e.g., a battery providing a supply voltage $V_S$ of, e.g., 13.8 V) is coupled to the driver circuit 10 (supply terminal $A_{VCC}$) to supply the driver $X_R$ and other circuitry, mainly logic circuitry, with current. The driver circuit 10 usually draws a constant bias current (quiescent current) denoted as $i_{CC}$ in the present example. The LED device 11 (e.g. including one light emitting diode LD) is coupled between the supply line providing the supply voltage $V_S$ and an output circuit node (terminal OUT) of the driver circuit 10. The driver circuit 10 is configured to sink the load current $i_L$ of the LED device 11 in accordance to a modulated control signal ON received at an input circuit node IN. For this purpose the driver circuit 10 includes a switchable (by means of switch SW) current source Q which is coupled between the output node OUT and a reference potential (e.g. ground potential GND coupled to output terminal $A_{GND}$) in such a manner that the load current $i_L$ is sunk at the output node OUT. In one exemplary embodiment the load current $i_L$, which sunk at circuit node OUT, is modulated (e.g., pulse density modulated in accordance with the control signal ON) and thus can assume only two different values, namely either zero or the fixed peak value $i_{Lmax}$. The driver $X_R$ is coupled to the switchable current source (in the present example to an electronic switch SW connected in series to the current source Q) in order to switch the load current $i_L$ on and off in accordance with the modulated control signal ON.

Figure 2:
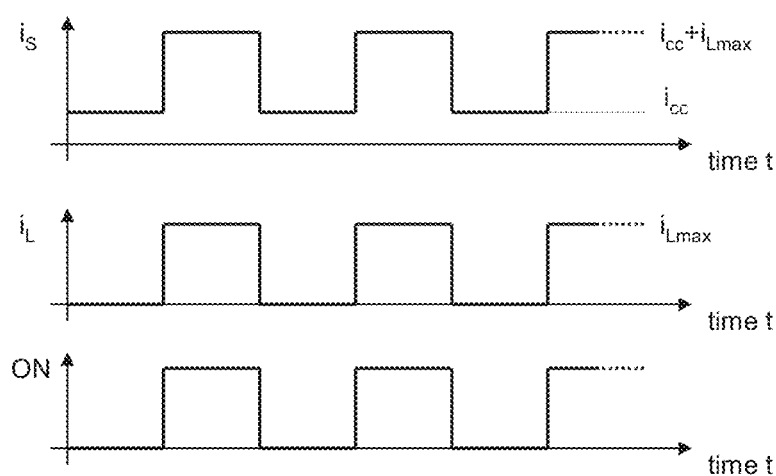
FIG. 2 is a timing diagram illustrating, inter alia, the load current and the supply line current over time as occurring during operation of the circuit of FIG. 1.

FIG. 2 illustrates the currents (load current $i_L$ and supply current $i_S$) occurring during operation in the driver circuit of FIG. 1 as well as the modulated control signal ON. The bottom diagram of FIG. 2 illustrates the modulated control signal ON which is, for example, a pulse width modulated signal having, in the present example, a duty cycle of 50%. A sigma-delta modulation (pulse density modulation PDM) would lead to a similar waveform of the modulated control signal. The timing diagram in the middle illustrates the load current $i_L$ flowing through the LED device 11 and sunk at the circuit node OUT of the driver circuit 10. The switching times of the load current $i_L$ match with the switching times of the modulated control signal ON (when ignoring signal propagation delays which are negligible for the present considerations). In the top diagram the waveform of the overall supply current $i_S$ is depicted. The supply current $i_S$ corresponds to the load current $i_L$ plus an additional current offset equaling the quiescent current $i_{CC}$ (bias current) of the driver circuit 10 and further circuitry. FIG. 2 shows that the switching of the load current $i_L$ in accordance with the modulated control signal gives rise to significant (step-like) current gradients and thus to an undesired emission of electromagnetic radiation and, as a consequence, to electromagnetic interference (EMI) degrading the electromagnetic compatibility (EMC) of the overall circuit arrangement.

Figure 3:
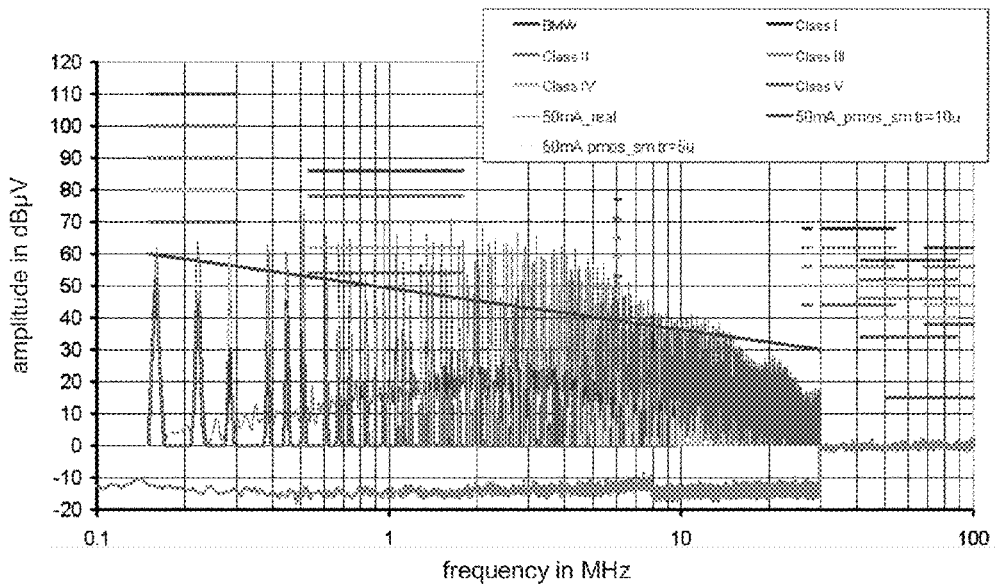
FIG. 3 is a diagram illustrating the spectra of interferences due to electromagnetic emissions under various operation conditions.

FIG. 3 illustrates the noise spectra resulting from different switching operations as well as the desired maximum noise level over frequency, which is the diagonal line extending from approximately 60 dBµV for a frequency of about 0.15 MHz to approximately 30 dBµV for a frequency of about 30 MHz, which is also known as the "BMW limit" (referring to the strict EMC requirements specified by the German car manufacturer BMW). It is desired to reduce the noise spectra to stay below the BMW limit. Compliance with this limit is a requirement for the application of a LED driver circuit in an automotive vehicle.

Figure 4:
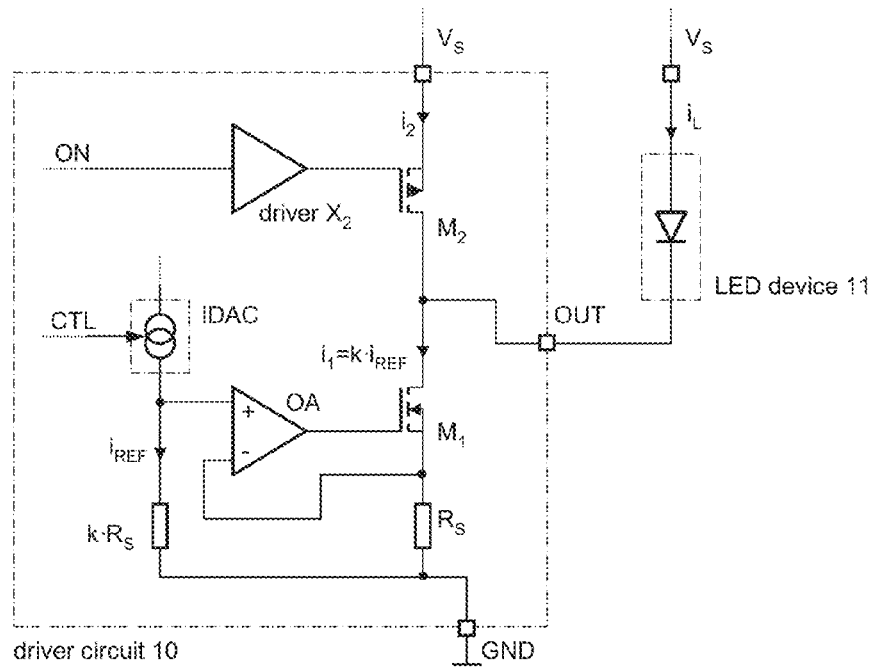
FIG. 4 is a circuit diagram illustrating a first exemplary driver circuit in accordance with the present invention.
Figure 5:
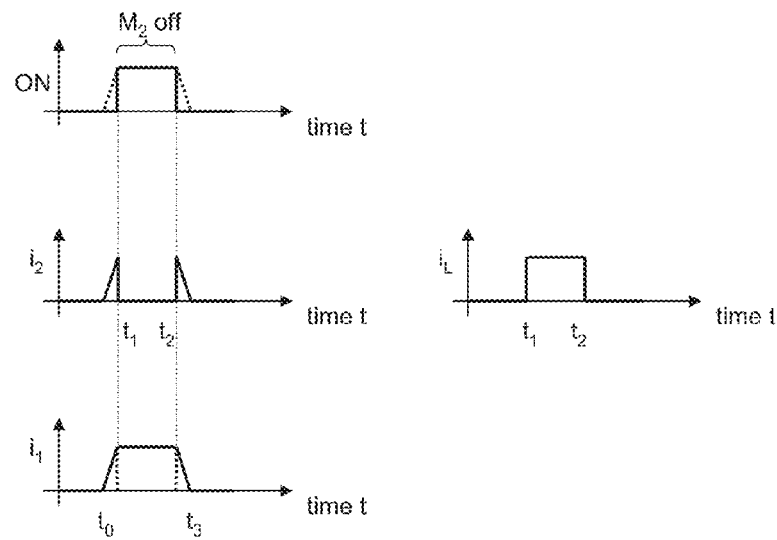
FIG. 5 includes a set of timing diagrams illustrating the waveforms of a number of signals occurring in the circuit of FIG. 4 during operation.

FIG. 4 illustrates an improved driver circuit 10 for providing a load current $i_L$ to a LED device 11 (including one or more LEDs). The driver circuit 10 is configured to modulate the load current $i_L$ provided to the LED device 11 in accordance with the modulation of the input signal ON and the control signal CTL. Exemplary waveforms of the input signal ON, the load current $i_L$ and the total supply current $i_S$ are illustrated in FIG. 5.

In the circuit diagram of FIG. 4, the switchable current source Q (see FIG. 1) is illustrated in more detail. In the present example, the switchable current source includes a current output digital-to-analog converter IDAC which is configured to provide a reference current $i_{REF}$ which can be set via the digital control signal CTL. That is, the value of the digital control signal CTL (e.g., an 8 bit signal) determines the actual analog value of the reference current $i_{REF}$. Thus, the current output digital-to-analog converter IDAC can be seen as (digitally) controllable current source. However, it should be noted that other types of controllable current sources may also be applicable. Furthermore, the current source Q includes an active current mirror which is implemented using an operational amplifier OA, the MOS transistor $M_1$, and the two resistors having resistance values of $R_S$ and $R_S'=k \cdot R_S$, respectively. The reference current is drained (e.g., to ground) via the resistor $R_S'$. The resulting voltage drop $i_{REF} \cdot k \cdot R_S$ is supplied to the non-inverting input of the operational amplifier OA. The output of the operational amplifier OA drives the gate of the MOS transistor $M_1$ such that the drain current $i_1$ of the transistor $M_1$ is proportional to the reference current $i_{REF}$ (by a proportionality factor of k). The source terminal of the MOS transistor $M_1$ is coupled to a reference potential, e.g., ground potential GND, via the second resistor $R_S$. The resulting voltage drop $i_1 \cdot R_S$ is fed back to the non-inverting input of the operational amplifier OA thus forming a closed-loop operational amplifier circuit. Due to the high amplification factor of the operational amplifier the difference between the operational amplifier's OA input voltages ($i_{REF} \cdot k \cdot R_S$ and $i_1 \cdot R_S$) is regulated to approximately zero and, as a consequence $i_1$ is regulated to equal, approximately, $k \cdot i_{REF}$. In essence the reference current is "mirrored" (and amplified by a factor k) as the drain current of the MOS transistor $M_1$. The drain of the transistor $M_1$ is coupled to the output circuit node OUT via which transistor $M_1$ is coupled with the LED device 11 so as to allow for sinking the LED device load current $i_L$ via transistor $M_1$.

Furthermore, the drain of the MOS transistor $M_1$ is also coupled to the supply terminal $A_{VCC}$ (and thus to the supply potential $V_S$) via a second MOS transistor $M_2$ whose gate is driven using the driver $X_2$ in accordance with the input signal ON. In the present example, transistor $M_1$ is an N-channel MOS transistor whereas transistor $M_2$ is a P-channel MOS transistor. The P-channel transistor $M_2$ is conductive when the gate is driven low (i.e., when the input signal ON is low).

The function of the driver circuit 10 as illustrated in FIG. 4 is further explained with reference to the signal timing diagrams illustrated in FIG. 5. Generally the shape of the waveform of $i_1$ can be (indirectly via the current minor OA, $R_S$, $R_S'$, $M_1$) set by the digital value CTL using the digital-to-analog-converter IDAC. When the P-channel MOS transistor $M_2$ is in its off state, then the load current of the LED device 11 equals the transistor current $i_1$. By fully or partially activating the p-channel MOS transistor $M_2$ in accordance with the input signal ON, the load current $i_L$ may be, fully or partially, be taken over by the transistor $M_2$. When the transistor $M_2$ is fully conductive (i.e., when signal ON is low) then the LED device is "bypassed" by the transistor $M_2$, the load current $i_L$ through the LED device is zero and the drain current $i_2$ of the transistor $M_2$ (also referred to as bypass transistor) equals the drain current $i_1$ of the N-channel MOS transistor $M_1$ which is set in accordance with the digital control signal CTL. It should be noted, that the total current drawn from the supply line and drained to ground GND is the drain current $i_2$ as set by the control signal CTL plus the quiescent current $i_{CC}$ (not shown in FIG. 4, see FIG. 1). Thus, the "shape" of the total supply current waveform (which is responsible for the EMC performance of the whole circuit) can be set by choosing an appropriate control signal CTL. The load current $i_L$ provided to the LED device 11 is only activated by switching off the bypass transistor $M_2$ (i.e., by setting the input signal ON to a high level for P-channel bypass transistors as used in the example of FIG. 5). In other words, the shape of the load supply current $i_1+i_{CC}$ is set using the control signal CTL in such a manner that the circuit complies with the requirements concerning EMI, whereas the current is "handed over" from bypass transistor $M_2$ to the LED device 11 by properly switching the input signal ON.

Exemplary waveform diagrams of the input signal ON, the currents $i_1$ and $i_2$ as well as $i_L$ are illustrated in FIG. 5 and discussed below. For the further discussion it is assumed that the load current $i_L$ is to be modulated (e.g., using pulse width modulation, pulse frequency modulation, pulse density modulation, or the like). The desired waveform of the load current $i_L$ is determined by the waveform of the input signal ON. To generate one load current pulse from time instant $t_1$ to $t_2$ the input signal ON is high from time instant $t_1$ to time instant $t_2$. During the time interval $t_2$-$t_1$ the bypass transistor is on an off state and the load current $i_L$ through the LED device equals the current $i_1$ set by the control signal CTL as explained above. While the input signal ON is low, e.g., for time instants $t<t_1$ and $t>t_2$ the P-channel bypass transistor $M_2$ is conductive and bypasses the LED device 11 and thus the LED device is in an off state.

Before actually switching the LED device 11 on at time instant $t_1$ the drain current $i_1$ of transistor $M_1$ is gradually ramped up from zero to the desired maximum value $i_{Lmax}$ (by correspondingly setting the value of the control signal CTL) while the bypass transistor $M_2$ is bypassing the LED device 12 and taking over the drain current $i_1$ of transistor $M_1$. During this ramp-up period (e.g., between the time instants $t_0$ and $t_1$) the bypass transistor $M_2$ is fully conductive and thus the equations $i_1=i_2$ and $i_L=0$ are (approximately) valid. The ramp-up of the drain current $i_1$ (which mainly contributes to the supply current) is illustrated in the bottom diagram in the left column of FIG. 5 (solid line). The corresponding waveform of the input signal ON is illustrated in the top diagram of the left column of FIG. 5. At the end of the ramp-up period (e.g., between the time instants $t_1$ and $t_2$) the bypass transistor $M_2$ is fully blocking (signal ON is high) and thus the equations $i_1=i_L$ and $i_2=0$ are (approximately) valid. In essence the current $i_1$ of the current source Q is "handed over" from the by transistor $M_2$ to the LED device 11. At the end of the desired load current pulse, i.e., at time instant $t_2$, the bypass transistor $M_2$, again, takes over the current $i_1$ and the following the equations $i_1=i_2$ and $i_L=0$ are, again, valid. Between the time instants $t_2$ and $t_3$ the current $i_1$ of the current source Q is ramped downed to zero with a defined slew rate. By properly setting the time intervals $t_1$-$t_0$ and $t_3$-$t_2$ (via the control signal CTL) the slew rate may be set to any desired value while maintaining a sharp transition (as desired) in the actual load current $i_L$ flowing through the LED device. A low slew rate (measured, e.g., in amperes per nanosecond, A/ns) significantly improves the electromagnetic compatibility by reducing the electromagnetic interferences (EMI) generated by the overall circuit.

Figure 6:
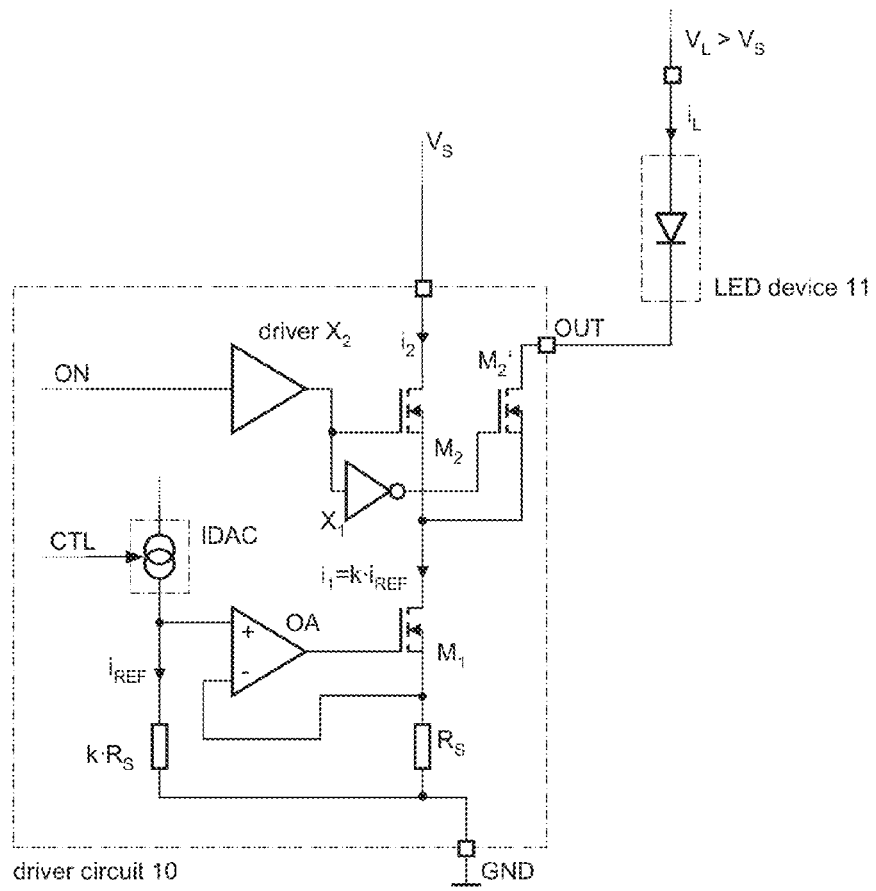
FIG. 6 is a circuit diagram illustrating a second exemplary driver circuit in accordance with the present invention.

The example illustrated in FIG. 6 is essentially identical with the example in FIG. 4, the only difference is that the P-channel bypass transistor $M_2$ is replaced by an N-channel bypass transistor (also denoted as $M_2$ in FIG. 6). Accordingly the input signal ON has to be inverted as compared to the example of FIG. 4. Furthermore the load current $i_L$ is not directly sunk by the MOS transistor $M_1$ as in the previous example, but via a third transistor $M_2'$ which is coupled between the LED device 11 and the load path of transistor $M_1$. The third transistor $M_2'$ is driven with a gate signal inverse (inverter $X_1$) to the gate signal of the bypass transistor $M_2$ (generated by driver $X_2$). The third transistor $M_2'$ is only required when the supply potential $V_L$ supplying the LED device 11 is higher as the supply potential $V_S$ supplying the driver circuit 10. Otherwise the intrinsic reverse diode of the bypass transistor $M_2$ would become conductive in a undesired manner. Nevertheless, the function of the example of FIG. 6 is essentially the same as the function of the previous example.

Figure 7:
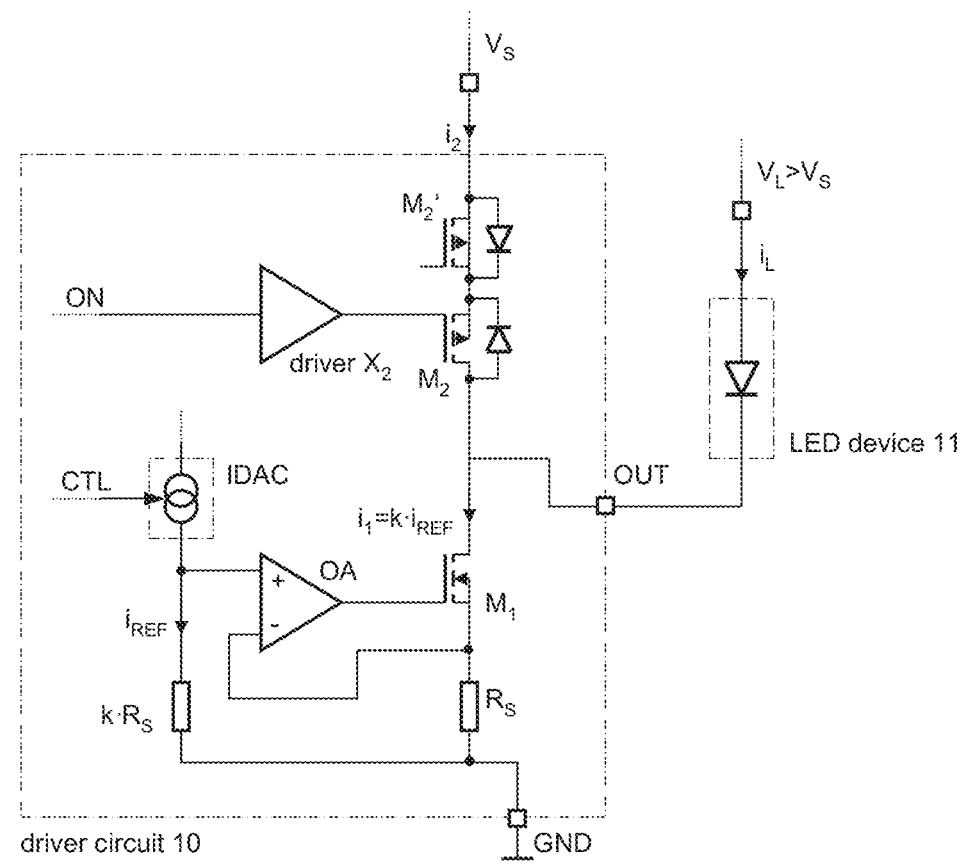
FIG. 7 is a circuit diagram illustrating a third exemplary driver circuit in accordance with the present invention.

The example of FIG. 7 is also essentially identical with the example of FIG. 4 with the only difference that the P-channel bypass transistor $M_2$ has a second P-channel transistor $M_2'$ coupled in series thereto in an "upside-down" configuration, such that the second P-channel MOS transistor $M_2'$ essentially operates as a diode preventing a reverse conduction of the actual bypass transistor $M_2$ in cases where the supply potential $V_L$ supplying the LED device 11 is higher as the supply potential $V_S$ supplying the driver circuit 10. The base of the second P-channel may be unconnected or its base may be connected to the source electrode.

It should be noted that the input signal ON defining the ON pulses of the load current $i_L$ and the control signal CTL defining the slew rate of the overall supply current as explained above are typically generated using a digital processor or a microcontroller. However, any other controllable signal sources may be appropriate.

Some aspects of the invention are summarized below. However, the following is not to be regarded as a complete enumeration of features essential for the present invention. In the figures discussed above a number of driver circuits are shown for providing a modulated load current $i_L$ to a load. The circuits comprise a controllable current source Q coupled to the load, which, e.g., is the LED device 11. The controllable current source Q is configured to sink our source a first current $i_1$ in accordance with a control signal CTL which may be a digital signal. A controllable switch (e.g., the bypass transistor $M_2$) is responsive to an input signal ON and connected to the current source Q. The switch is configured to take over, or not, the first current $i_1$ in accordance with the input signal ON, in such a manner that the first current $i_1$ is directed as load current $i_L$ through the LED device 11 when the controllable switch is driven into a blocking state. Further, the first current $i_1$ is directed through the controllable switch when the switch is driven into its conducting state thus bypassing the LED device 11. For this purpose the input signal ON includes a first series of pulses which define the desired load current waveform in accordance with a desired modulation scheme. Finally, the current source Q is controlled such that the first current $i_1$ is ramped up before a pulse of the input signal ON and ramped down after the pulse to achieve desired ramp-up and ramp-down times. The ramp-up and ramp-down times are set to achieve a desired slew rate of the first current $i_1$.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those not explicitly mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A driver circuit for providing a modulated load current to a load, the driver circuit comprising:
    a controllable current source operably coupled to the load and configured to sink or source a first current in accordance with a control signal;
    a controllable switch responsive to an input signal, the controllable switch operably coupled to the current source and configured to take over, or not take over, the first current in accordance with the input signal, such that the first current is directed as a load current through the load when the controllable switch is driven into a blocking state, and the first current is directed through the controllable switch when the controllable switch is driven into a conducting state thus bypassing the load, wherein the controllable switch comprises a bypass transistor having a main current path coupled to the controllable current source, the bypass transistor configured to be switched on and off in accordance with the input signal; and
    a further transistor coupled between the controllable current source and the load, the further transistor configured to be driven with an inverted version of the input signal provided to the bypass transistor;
    wherein the input signal includes a first series of pulses defining a desired load current waveform in accordance with a desired modulation scheme; and
    wherein the controllable current source is controlled such that the first current is ramped up before a pulse of the input signal and ramped down after the pulse to achieve desired ramp-up and ramp-down times.

2. The driver circuit of claim 1, wherein the controllable current source comprises a digital-to-analog converter configured to receive digital values of the control signal and to provide a respective analog signal, wherein the driver is configured to provide the first current such that the first current is substantially proportional to the analog signal.

3. The driver circuit of claim 1, wherein the controllable current source comprises:
    a current output digital-to-analog converter configured to receive digital values of the control signal and to provide a reference current responsive to the control signal; and
    a current mirror circuit configured to provide the first current such that the first current is proportional to the reference current.

4. The driver circuit of claim 1, wherein the bypass transistor is coupled between the controllable current source and a first supply potential.

5. The driver circuit of claim 4, wherein the bypass transistor comprises a P-channel MOS transistor.

6. The driver circuit of claim 1, wherein the bypass transistor and the further transistor comprise N-channel MOS transistors.

7. The driver circuit of claim 1, wherein the input signal and the control signal are provided by a micro-controller or a digital processor.

8. The driver circuit of claim 1, further comprising a processor, wherein the input signal and the control signal are provided by the processor.

9. The driver circuit of claim 8, wherein the processor comprises a micro-controller.

10. The driver circuit of claim 8, wherein the processor comprises a digital processor.

11. The driver circuit of claim 1, wherein the first current is linearly ramped up before the pulse of the input signal and linearly ramped down after the pulse.

12. A driver circuit for providing a modulated load current to a load, the driver circuit comprising:
    a controllable current source operably coupled to the load and configured to sink or source a first current in accordance with a control signal; and
    a controllable switch responsive to an input signal, the controllable switch operably coupled to the current source and configured to take over, or not take over, the first current in accordance with the input signal, such that the first current is directed as a load current through the load when the controllable switch is driven into a blocking state, and the first current is directed through the controllable switch when the controllable switch is driven into a conducting state thus bypassing the load, wherein the controllable switch comprises a bypass transistor having a main current path coupled to the controllable current source, the bypass transistor configured to be switched on and off in accordance with the input signal;
    wherein the input signal includes a first series of pulses defining a desired load current waveform in accordance with a desired modulation scheme;
    wherein the controllable current source is controlled such that the first current is ramped up before a pulse of the input signal and ramped down after the pulse to achieve desired ramp-up and ramp-down times; and
    wherein the bypass transistor comprises a P-channel MOS transistor, the driver circuit further comprising a further P-channel MOS transistor coupled in series with the bypass transistor such that source electrodes of the bypass transistor and the further P-channel MOS transistor are directly connected to a common circuit node in such a way that the further P-channel MOS transistor operates as a diode.

13. The driver circuit of claim 12, wherein the first current is linearly ramped up before the pulse of the input signal and linearly ramped down after the pulse.

14. A driver circuit for providing a modulated load current to a load, the driver circuit comprising:
    a controllable current source operably coupled to the load and configured to sink or source a first current in accordance with a control signal; and
    a controllable switch responsive to an input signal, the controllable switch operably coupled to the current source and configured to take over, or not take over, the first current in accordance with the input signal, such that the first current is directed as a load current through the load when the controllable switch is driven into a blocking state, and the first current is directed through the controllable switch when the controllable switch is driven into a conducting state thus bypassing the load;

wherein the input signal includes a first series of pulses defining a desired load current waveform in accordance with a desired modulation scheme;

wherein the controllable current source is controlled such that the first current is ramped up before a pulse of the input signal and ramped down after the pulse to achieve desired ramp-up and ramp-down times; and wherein the control signal is composed of a second series of pulses having a defined slew rate, wherein each pulse of the first series of pulses occurs during a corresponding pulse of the second series.

15. The driver circuit of claim 14, wherein the pulses of the second series have pulse widths that are longer than pulse widths of corresponding pulses of the first series by at least respective ramp-up and the ramp-down times of the pulses of the second series.

16. The driver circuit of claim 14 wherein a ramp-up time period and a ramp-down time period of one pulse of the second series occur prior to and, respectively, after the corresponding pulse in the first series.

17. The driver circuit of claim 14, wherein the first current is linearly ramped up before the pulse of the input signal and linearly ramped down after the pulse.

18. A method for providing a modulated load current to a load, the method comprising:

providing a first current in accordance with a control signal;

taking over, or not taking over, the first current using a controllable switch in accordance with an input signal, such that the first current is directed as a load current through the load when the controllable switch is driven into a blocking state, and the first current is directed through the controllable switch when the controllable switch is driven into a conducting state thus bypassing the load;

wherein the input signal includes a first sequence of pulses that define a desired load current waveform in accordance with a desired modulation scheme;

wherein a current source is configured to be controlled such that the first current is ramped up before a pulse of the input signal and ramped down after the pulse to achieve desired ramp-up and ramp-down times;

wherein the controllable switch comprises a bypass transistor having a main current path coupled to the current source, the bypass transistor configured to be switched into the conducting state or into the blocking state in accordance with the input signal; and switching a further transistor coupled between the current source and the load, the further transistor configured to be driven with an inverted version of the input signal provided to the bypass transistor.

19. The method of claim 18, wherein the control signal is composed of a second sequence of pulses having a defined slew rate, wherein each pulse of the first sequence occurs during a corresponding pulse of the second sequence.

20. The method of claim 19, wherein the pulses of the second sequence have pulse widths that are longer than pulse widths of the corresponding pulses of the first sequence by at least the respective ramp-up and the ramp-down times of the pulses of the second sequence.

21. The method of claim 19, wherein a ramp-up time period and a ramp-down time period of one pulse of the second sequence occur prior to and, respectively, after the corresponding pulse in the first sequence.

22. The method of claim 18, wherein the first current is linearly ramped up before the pulse of the input signal and linearly ramped down after the pulse.

* * * * *